United States Patent
An et al.

(10) Patent No.: US 8,173,323 B2
(45) Date of Patent: May 8, 2012

(54) BINDER FOR A FUEL CELL CATALYST COMPOSITION, A MEMBRANE ELECTRODE ASSEMBLY FOR A FUEL CELL USING THE BINDER AND A METHOD FOR PREPARING A MEMBRANE ELECTRODE ASSEMBLY

(75) Inventors: Sung-Guk An, Yongin-si (KR);
Min-Kyu Song, Yongin-si (KR);
You-Mee Kim, Yongin-si (KR);
Young-Mi Park, Yongin-si (KR);
Chang-Bong Lee, Yongin-si (KR);
Ho-Jin Kweon, Yongin-si (KR);
Si-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1072 days.

(21) Appl. No.: 11/542,744

(22) Filed: Oct. 3, 2006

(65) Prior Publication Data

US 2010/0081028 A1    Apr. 1, 2010

(30) Foreign Application Priority Data

Oct. 6, 2005 (KR) .................. 10-2005-0093844

(51) Int. Cl.
*H01M 8/14* (2006.01)
(52) U.S. Cl. ......... 429/479; 429/523; 252/500; 528/220
(58) Field of Classification Search .................. 252/500; 528/220; 429/30, 40
See application file for complete search history.

(56) References Cited

U.S. PATENT DOCUMENTS

| | | | |
|---|---|---|---|
| 4,163,725 A | 8/1979 | Sano et al. | |
| 5,795,496 A | 8/1998 | Yen et al. | |
| 6,150,047 A | 11/2000 | Yen et al. | |
| 7,544,433 B2 * | 6/2009 | Sohma et al. | 429/493 |
| 2005/0136314 A1 * | 6/2005 | Stone et al. | 429/33 |

FOREIGN PATENT DOCUMENTS

| | | |
|---|---|---|
| EP | 1 624 513 A1 | 2/2006 |
| JP | 11-67224 | 3/1999 |
| JP | 2002-164055 | 6/2002 |
| JP | 2003-292609 | 10/2003 |
| JP | 2004-47244 | 2/2004 |
| JP | 2004-281422 | 10/2004 |

(Continued)

OTHER PUBLICATIONS

European Search Report dated Jan. 31, 2007, for EP 06121862.4, in the name of Samsung SDI Co, Ltd.

(Continued)

*Primary Examiner* — Laura Weiner
(74) *Attorney, Agent, or Firm* — Christie, Parker & Hale, LLP

(57) ABSTRACT

A membrane-electrode assembly includes a polymer electrolyte membrane with an anode and a cathode on opposite sides. Each of the anode and the cathode includes an electrode substrate, and a catalyst layer is formed on at least one of the electrode substrates and includes at least one proton conductive crosslinked polymer. The membrane-electrode assembly may include catalyst layers that are positioned on opposite sides of a polymer electrolyte membrane, either of which includes at least one crosslinked proton conductive polymer.

11 Claims, 2 Drawing Sheets

FOREIGN PATENT DOCUMENTS

| | | |
|---|---|---|
| JP | 2004-359925 | 12/2004 |
| JP | 2005-139432 | 6/2005 |
| JP | 2005-232439 | 9/2005 |
| JP | 2005-264008 | 9/2005 |
| KR | 2001-0037100 | 5/2001 |
| NL | 7701015 | 8/1977 |
| WO | WO 00/24796 | 5/2000 |
| WO | WO 2004/091027 A1 | 10/2004 |

OTHER PUBLICATIONS

Patent Abstracts of Japan, Publication No. 11-067224, dated Mar. 9, 1999, in tha name of Mitsuo Konishi et al.

Patent Abstracts of Japan, Publication No. 2004-047244, dated Feb. 12, 2004, in tha name of Takehiko Onomi et al.

Patent Abstracts of Japan, Publication No. 2004-281422, dated Oct. 7, 2004, in tha name of Toru Koyama et al.

Korean Patent Abstracts, Publication No. 1020010037100 A, dated May 7, 2001, in the name of Hui Tak Kim et al.

Japanese Office action dated May 18, 2010, for corresponding Japanese Patent application 2006-275455, noting listed references in this IDS.

SIPO Office action dated Mar. 3, 2011, for corresponding Chinese Patent application 200610064003.7, with English translation, noting references previously filed in an IDS dated Apr. 30, 2007.

Japanese Notice of Allowance dated Aug. 9, 2011, for corresponding Japanese Patent application 2006-275455, noting listed reference in this IDS, as well as several references previously submitted in an IDS dated Jun. 9, 2010,. 2 pages.

\* cited by examiner

BINDER FOR A FUEL CELL CATALYST COMPOSITION, A MEMBRANE ELECTRODE ASSEMBLY FOR A FUEL CELL USING THE BINDER AND A METHOD FOR PREPARING A MEMBRANE ELECTRODE ASSEMBLY

CROSS-REFERENCE TO RELATED APPLICATION

This application claims priority to and the benefit of Korean Patent Application No. 10-2005-0093844 filed in the Korean Intellectual Property Office on Oct. 6, 2005, the entire content of which is incorporated herein by reference.

BACKGROUND

1. Field of the Invention

The present invention relates to a binder for a fuel cell catalyst composition, a membrane-electrode assembly including the same, and a method of preparing the same.

2. Description of the Related Art

A fuel cell is a power generation system for producing electrical energy through an electrochemical redox reaction of an oxidant and a fuel such as hydrogen, or a hydrocarbon-based material, such as methanol, ethanol, natural gas, or the like.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte membrane fuel cell is an environmentally friendly energy source for replacing conventional energy sources. It has advantages such as high power output density and energy conversion efficiency, operability at room temperature, and is able to be down-sized and closely sealed. Therefore, it can be applicable to a wide array of fields such as non-polluting automobiles, electricity generation systems, and portable power sources for mobile equipment, military equipment, and the like.

The polymer electrolyte membrane fuel cell has an advantage of high energy density, but it also has problems in the need to carefully handle hydrogen gas and the requirement of accessory facilities such as a fuel reforming processor for reforming methane or methanol, natural gas, or the like in order to produce hydrogen as the fuel gas.

In contrast, a direct oxidation fuel cell has a lower energy density than polymer electrolyte membrane fuel cell, but it has the advantages of easier handling of the liquid-type fuel, a low operation temperature, and no need for additional fuel reforming processors. Therefore, it has been acknowledged as an appropriate system for a portable power source for small electrical equipment.

In a fuel cell system, the stack that generates electricity substantially includes a plurality of unit cells arranged in a stacked configuration where each unit cell is formed of a membrane-electrode assembly (MEA) and a separator (also referred to as a bipolar plate). Each membrane-electrode assembly has an anode (also referred to as "a fuel electrode" or "an oxidation electrode") and a cathode (also referred to as "an air electrode" or "a reduction electrode") arranged on opposite sides of a polymer electrolyte membrane.

The separators not only work as passageways for supplying the fuel required to the anode and for supplying oxygen to the cathode, but also as conductors serially connecting the anode and the cathode in the membrane-electrode assembly. The electrochemical oxidation reaction of the fuel occurs at the anode and the electrochemical reduction reaction of oxygen occurs at the cathode, thereby producing electricity, heat, and water due to the transfer of the electrons generated during this process.

SUMMARY OF THE INVENTION

An embodiment of the present invention provides a binder for a fuel cell, which can prevent elution of a polymer in a catalyst layer during a cell operation by improving adherence between a membrane and an electrode in a membrane-electrode assembly. Such an embodiment provides excellent affinity for a polymer electrolyte membrane to improve interface characteristics, improved proton transfer capability, and can also prevent catalyst poisoning.

Another embodiment of the present invention provides a composition for forming a catalyst layer which includes the above binder and a solvent such as water.

Yet another embodiment of the present invention provides a membrane-electrode assembly and a method of making the same using the composition for forming a catalyst layer.

According to an embodiment of the present invention, a binder for a fuel cell is formed by crosslinking at least one polymer selected from the group consisting of compounds represented by Formulas 1 and 2:

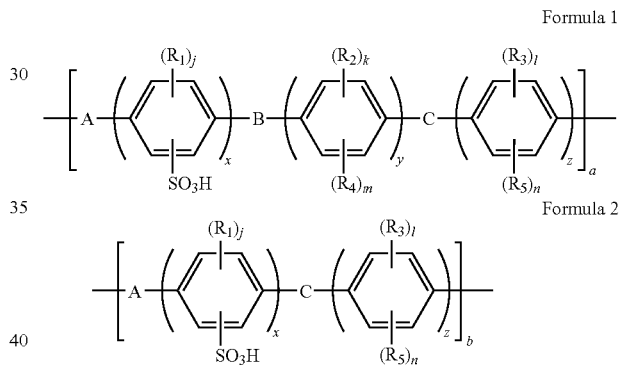

where each of A, B, and C is independently oxygen, sulfur, SO, carbonyl, or sulfonyl; each of x, y, and z is independently an integer ranging from 1 to 10; each of $R_1$, $R_2$, $R_3$, $R_4$, and $R_5$ is independently hydrogen, a halogen atom, an alkyl, an allyl, an aryl, an alkylphosphoric acid, an alkylsulfonic acid, a fluoro alkylsulfonic acid (an alkylsulfonic acid where at least one hydrogen is substituted with fluorine), sulfonic acid, carboxylic acid, phosphoric acid, phosphonic acid, or a derivative thereof; each of j, k, l, m, and n independently ranges from 1 to 3; a is 1 to 100,000; and b ranges from 3 to 10,000.

According to another embodiment of the present invention, a binder for a fuel cell is provided which includes a compound represented by Formula 1a:

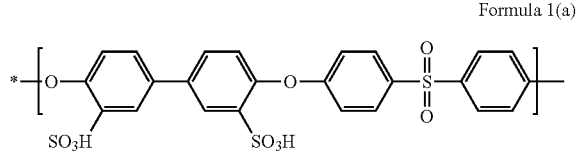

According to yet another embodiment of the present invention, a composition for forming a catalyst layer is provided which includes at least one binder selected from the compounds represented by Formulas 1 and 2.

According to still another embodiment of the present invention, a polymer electrolyte membrane is provided which includes at least one binder selected from Formulas 1 and 2.

According to still another embodiment of the present invention, a membrane-electrode assembly is provided which includes the polymer electrolyte membrane described above in combination with an anode and a cathode on opposite sides of the polymer electrolyte membrane.

For such an embodiment, at least one of the anode and cathode includes a catalyst layer formed on an electrode substrate. The catalyst layer includes at least one binder which is formed by crosslinking one or more of the compounds selected from Formulas 1 and 2.

According to still another embodiment of the present invention, a membrane-electrode assembly is provided in which catalyst layers are directly formed on both sides of a polymer electrolyte membrane. At least one of the catalyst layers includes at least one binder including one or more crosslinked compounds of Formulas 1 and 2.

According to yet another embodiment of the present invention, a method for making a membrane-electrode assembly is provided which includes preparing a composition for forming a catalyst layer, coating the composition on electrode substrates, crosslinking the composition to fabricate an anode and a cathode, and positioning a polymer electrolyte membrane between the anode and the cathode.

According to still another embodiment of the present invention, a method for making a membrane-electrode assembly is provided which includes preparing a composition for forming a catalyst layer, coating the composition on a polymer electrolyte membrane, and crosslinking the composition.

DETAILED DESCRIPTION

A membrane-electrode assembly of the prior art using a non-fluorine-based polymer includes a hydrocarbon polymer of Formula 3 as an electrolyte membrane:

formance characteristics. Currently, a NAFION™ polymer resin which includes a fluorinated resin is generally used as a binder resin for the catalyst layer of a membrane-electrode assembly for a fuel cell.

However, when the NAFION™ resin is applied to fabricate the non-fluorine-based membrane-electrode assembly, it has low adherence to the interface with a polymer represented by the above Formula 3, decreasing the life span of a fuel cell in which it is used. Further, since the polymer represented by the above Formula 3 includes hydrophobic parts as well as hydrophilic parts, it has low solubility in water or alcohol, resulting in its limited applications. Accordingly, the polymer is used by being dissolved in only organic solvents. However, not all of the organic solvent is volatilized after subsequent heat treatment, and some is absorbed into the polymer, causing catalyst poisoning.

According to an embodiment of the present invention, a hydrophilic polymer with the same or a similar structure as that of the non-fluorine-based hydrocarbon polymer electrolyte membrane is used to provide a membrane-electrode assembly for a fuel cell having improved adherence between a polymer electrolyte membrane and an electrode.

Since a polymer of the present invention has a proton conductive group and is thereby hydrophilic, it can be dissolved easily in a solvent such as water, alcohol, and similar solvents. Therefore, when the hydrophilic polymer is used as a binder to fabricate a membrane-electrode assembly, the present invention can provide an excellent water-based composition for forming a catalyst layer. In addition, since the processes used in certain embodiments of the present invention are water-based, the present invention can prevent catalyst poisoning and simultaneously contribute to solving environmental problems.

Figure 2:
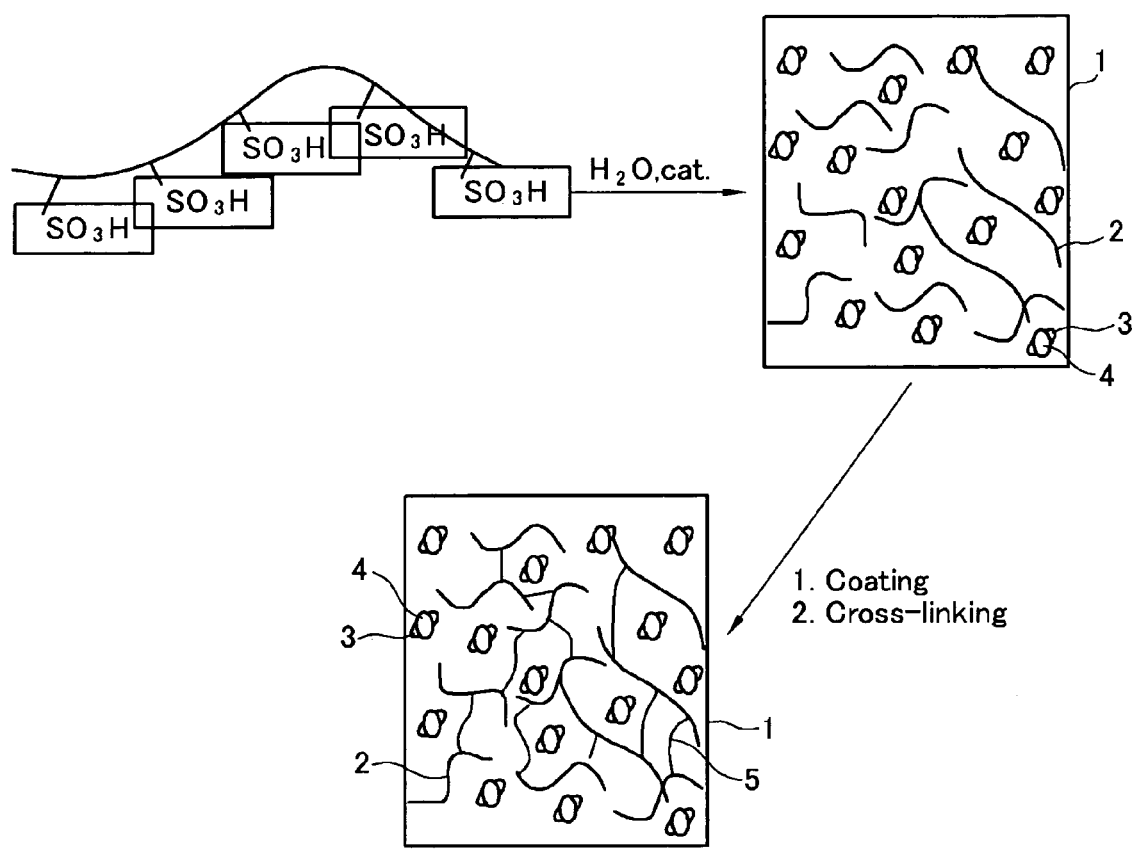
FIG. 2 is a schematic drawing showing crosslinked proton conductive non-fluorine-based binders during fabrication of a membrane-electrode assembly.

Certain embodiments of the present invention can also improve adherence between a polymer electrolyte membrane and an electrode by coating a composition for forming a catalyst layer on an electrode substrate or directly coating the composition on a polymer electrolyte membrane, and thereafter forming a crosslinking structure of the polymer through the crosslinking treatment of the polymer-catalyst binder layer. FIG. 2 is an illustration showing a non-fluorine-based binder with a proton conductive group coated on an electrode substrate or a polymer electrolyte membrane, which are adhered to each other by crosslinking. As shown in FIG. 2, reference numeral 1 denotes an electrode substrate or a polymer electrolyte membrane, 2 denotes a binder, 3 denotes a catalyst, 4 denotes a catalyst support, and 5 denotes binders connected by crosslinking.

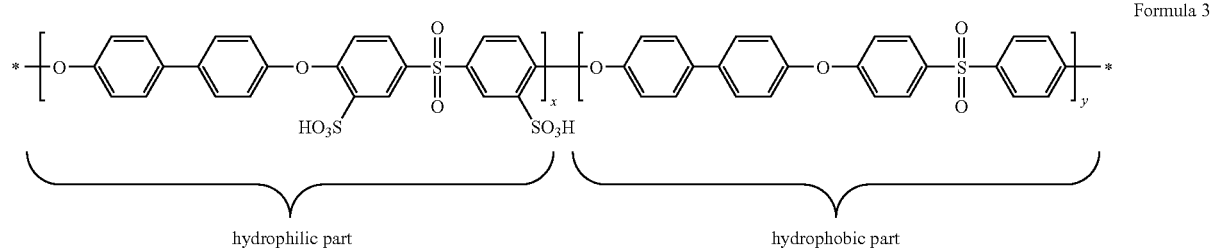

Formula 3

The hydrocarbon polymer electrolyte membrane can implement equivalent or better initial performance characteristics of a fuel cell than a NAFION™ membrane. When the polymer has a ratio, x:y of about 1:1 between hydrophilic parts and hydrophobic parts, a fuel cell including the polymer is known to have high proton conductivity and excellent per- In addition, such a polymer is not easily dissolved in water due to the crosslinking between the polymer and the catalyst layer, and elution of the polymer can be prevented in the catalyst layer during the cell operation. Since a binder resin in a catalyst layer has the same main chain as that of a polymer electrolyte membrane and thereby has higher affinity for the polymer electrolyte membrane than a conventional catalyst layer including a NAFION™ binder, it can improve the interface characteristics, and improve the long term stability of a cell. According to an embodiment of the present invention, a large amount of a proton conductive polymer such as a sulfonic acid group in the binder resin provides high proton conductivity. Therefore, it has a higher ion exchange capacity than other polymers.

According to an embodiment of the present invention, a polymer has an excellent ion exchange capacity of at least 2.0, compared with NAFION™ having an ion exchange capacity ranging from 0.9 to 1.0. Therefore, an embodiment of the present invention can deliver protons produced on the surface of a catalyst to a polymer electrolyte membrane speedily as well as effectively.

Since a binder resin is crosslinked with a catalyst layer, embodiments of the present invention can also avoid decomposition of a polymer, which has been reported as a problem with conventional non-fluorine-based polymers.

According to an embodiment of the present invention, a polymer may be selected from the compounds represented by Formulas 1 and 2:

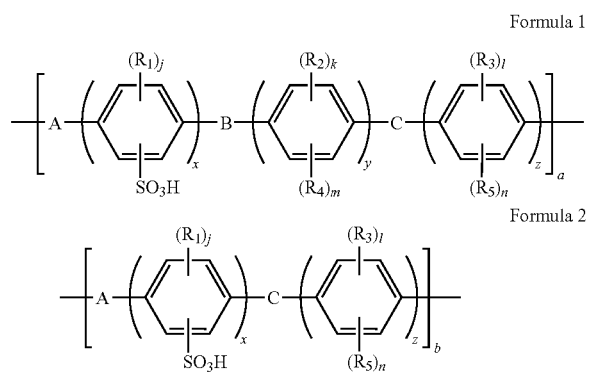

where each of A, B, and C is independently oxygen, sulfur, SO, carbonyl, or sulfonyl; each of x, y, and z is independently an integer from 1 to 10; each of $R_1$, $R_2$, $R_3$, $R_4$, and $R_5$ is independently hydrogen, a halogen atom, an alkyl, an allyl, an aryl, an alkylphosphoric acid, an alkylsulfonic acid, a fluoro alkylsulfonic acid, sulfonic acid, carboxylic acid, phosphoric acid, phosphonic acid, or a derivative thereof; each of j, k, l, m, and n ranges independently from 1 to 3; a is 1 to 100,000, preferably 1 to 10,000, and more preferably 1 to 10,000; and b ranges from 3 to 10,000, preferably 3 to 1000, and more preferably 3 to 100.

According to one embodiment, the alkyl has a $C_1$ to $C_{24}$, preferably $C_1$ to $C_7$ carbon number and the aryl has a $C_6$ to $C_{24}$, preferably $C_6$ to $C_{12}$ carbon number. According to an embodiment of the present invention, a binder for a fuel cell is formed by crosslinking at least one polymer selected from the compounds of Formulas 1 and 2. In addition, at least one polymer selected from the compounds represented by Formulas 1 and 2 can be used as a binder of a fuel cell. In an embodiment of the present invention, a membrane-electrode assembly is provided including at least one binder selected from the compounds represented by Formulas 1 and 2.

In an embodiment of the invention, the compound of Formula 1 or 2 has sulfonic acid groups present in at least 50 mol % and preferably more than 60 mol %, making the polymer hydrophilic. According to one embodiment, the compounds of Formula 1 or 2 has 100 mol % sulfonic acid groups, and therefore, is 100 mol % hydrophilic.

In general, a polymer of the present invention may be represented by Formula 1a with a polymerization degree ranging from 100 to 1000 and a molecular weight ranging from 10,000 to 100,000:

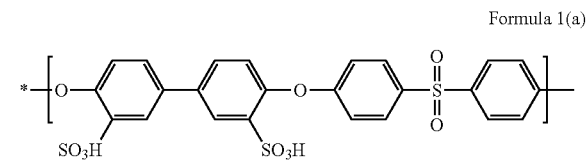

In an embodiment of the invention, a polymer selected from the compounds represented by Formulas 1 and 2 can be obtained by sulfonating polyarylene. In addition, the compound can additionally include a proton conductive group through an electropholic substitution reaction such as sulfonation, carboxylation, phosphorylation, phosphonylation, and so on. Suitable polyarylenes include poly(arylene ether sulfone), poly(arylene ether ketone), poly(arylene ether ether sulfone), or poly(arylene ether ether ketone).

The sulfonation may be performed in accordance with the following process, but is not limited thereto. According to an embodiment of the present invention, when a sulfonic acid group is introduced into a non-fluorine-based polymer, the sulfonic acid group can be substituted by reacting reagents such as sulfuric acid, fuming sulfuric acid, sulfur trioxide, chlorosulfuric acid, or chlorosulfonic acid. When another substituent other than the sulfonic acid having a proton conductive group is introduced into a non-fluorine-based polymer, it can be performed through a common reaction without any limiting conditions.

In addition, according to an embodiment of the present invention a composition for forming a catalyst layer is provided which includes at least one polymer selected from the group consisting of the compounds of Formulas 1 and 2 as a binder, a catalyst, and a protic solvent.

The protic solvent may be selected from the group consisting of water, ethanol, isopropyl alcohol, n-propyl alcohol, butanol, dimethyl sulfoxide, and mixtures thereof. In one embodiment, the protic solvent includes water.

According to an embodiment of the present invention, a membrane-electrode assembly for a fuel cell is provided using the composition for forming a catalyst layer described above.

According to an embodiment of the present invention, a membrane-electrode assembly for a fuel cell includes an anode and a cathode on opposite sides of a polymer electrolyte membrane. At least one of the anode and cathode includes an electrode substrate, and a catalyst layer formed on the electrode substrate including at least one binder having a crosslinking structure, and selected from the compounds represented by Formulas 1 and 2.

According to another embodiment of the present invention, a membrane-electrode assembly for a fuel cell includes an anode and a cathode on opposite sides of a polymer electrolyte membrane. At least one of the anode and cathode includes an electrode substrate, and a catalyst layer including at least one binder coated on the polymer electrode membrane and selected from the compounds represented by Formulas 1 and 2.

According to such an embodiment, the cathode and anode may be composed of an electrode substrate and a catalyst layer. In the fuel cell, an anode and a cathode are differentiated as to their reaction. At an anode, a fuel such as hydrogen, methanol, ethanol, or formic acid is oxidized, and at a cathode, an oxidant such as oxygen or air is reduced. The catalyst layer for a fuel cell of the present invention can be at either the cathode, the anode, or both the cathode and the anode. A fuel cell is operated as follows: hydrogen or another fuel is supplied to an anode, and an oxidant is supplied to a cathode. The system generates electricity through electrochemical reactions at the anode and cathode.

Suitable catalysts for the catalyst layer include one or more of platinum, ruthenium, osmium, platinum-ruthenium alloys, platinum-osmium alloys, platinum-palladium alloys, or platinum-M alloys, where M is at least one metal selected from the group consisting of Ga, Ti, V, Cr, Mn, Fe, Co, Ni, Cu, Zn, Sn, Mo, W, Rh, and combinations thereof. Preferred catalysts are selected from the group consisting of platinum, ruthenium, osmium, platinum-ruthenium alloys, platinum-osmium alloys, platinum-palladium alloys, platinum-cobalt alloys, and platinum-nickel alloys.

The catalyst may be used either in its metallic form (a black type catalyst) or it may be supported on a carrier. Suitable carriers include carbon such as acetylene black, denka black, activated carbon, ketjen black, and graphite, and inorganic particulates such as alumina, silica, zirconia, and titania. A carbon carrier is generally used. When the catalyst is a noble metal supported with a carrier, it may include one of those commercially available that is already provided with a carrier, or it may be prepared by supporting the noble metal on a carrier. Since the process for supporting a noble metal on a carrier is known in the art, it is omitted from this description.

The electrode substrate supports an electrode and diffuses reactants into the catalyst layer to help the reactant to approach the catalyst layer. The electrode substrate is a conductive substrate acting as a diffusion layer, and exemplary substrates include carbon paper, carbon cloth, carbon felt, or metal cloth (a polymer fibrous cloth or a porous film that is comprised of a fibrous metal cloth on which a metal film is formed), but is not limited thereto.

For the electrode substrate, it is preferable to use one treated with a water-repellent by using a fluorine-based resin to prevent the deterioration of reactant diffusion efficiency due to the water generated during the fuel cell operation. The fluorine-based resin may include, but is not limited to, polyvinylidene fluoride, polytetrafluoroethylene, fluorinated ethylene propylene, polychlorotrifluoroethylene, a fluoroethylene polymer, polyhexafluoro propylene, polyperfluoroalkylvinyl ether, polyperfluoro sulfonylfluoride alkoxy vinyl ether, and copolymers thereof.

A micro-porous layer (MPL) can be added between the electrode substrate and a catalyst layer to increase reactant diffusion effects. A suitable microporous layer is a conductive powder having a small particle diameter, and examples include carbon powder, carbon black, acetylene black, activated carbon, carbon fiber, fullerene, or carbon nanotubes. It is formed by coating a composition comprising a conductive powder, a binder resin, and a solvent on the electrode substrate. Suitable binder resins include polytetrafluoroethylene, polyvinylidenefluoride, polyvinylalcohol, and celluloseacetate. Suitable solvents include alcohols such as ethanol, isopropyl alcohol, n-propyl alcohol, and butanol, water, dimethylacetamide, dimethylsulfoxide, and N-methylpyrrolidone. The coating method may include, but is not limited to, screen printing, spray coating, doctor blade methods, gravure coating, dip coating, silk screening, and painting, and the method chosen may depend on the viscosity of the composition.

According to an embodiment, the polymer electrolyte membrane includes at least one of the compounds represented by Formulas 1 and 2. Alternatively, the polymer electrolyte membrane may include a general non-fluorine-based polymer membrane and a fluorine-based polymer electrolyte membrane. The non-fluorine-based polymer electrolyte membrane may include poly(arylene ether sulfone). The fluorine-based polymer electrolyte membrane may include a conventional high proton conductive polymer. The fluorine-based proton conductive polymer may be any proton conductive polymer. Non-limiting examples of the polymer include perfluoro-based polymers such as poly(perfluorosulfonic acid) (NAFION™, Dupont Company). The polymer electrolyte membrane may be any polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly (2,2'-(m-phenylene)-5,5'-bibenzimidazole), poly (2,5-benzimidazole), and combinations thereof. In an embodiment, the polymer membrane may have a thickness ranging from 10 to 200 µm.

According to another embodiment of the invention, the membrane-electrode assembly is fabricated in accordance with the following process: a composition for forming a catalyst layer is prepared, and the composition is applied to an electrode substrate and crosslinked to fabricate an anode and a cathode which are positioned on opposite sides of a polymer electrolyte membrane.

In another embodiment, the membrane-electrode assembly may be fabricated in accordance with the following process: a composition for forming a catalyst layer is applied on at least one surface of a polymer electrolyte membrane and crosslinked.

The crosslinking may be performed by radiating plasma, UV rays, or gamma rays (γ-ray), etc., to a coating layer. The crosslinking between a polymer electrolyte membrane and a binder resin in a catalyst layer may be performed partially or totally. UV crosslinking agents may be added during the crosslinking, as needed. Non-limiting examples of crosslinking agents include chloro benzophenone and alkoxy benzophenone.

A fuel cell system including the membrane-electrode assembly of the present invention includes at least one electricity generating element, a fuel supplier and an oxidant supplier.

The electricity generating element includes a membrane-electrode assembly assembled in accordance with the embodiment set forth above, and separators are positioned at opposite sides of the membrane-electrode assembly. The membrane-electrode assembly includes an anode and a cathode on opposite sides of a polymer electrolyte membrane. The fuel cell generates electricity through oxidation of a fuel and reduction of an oxidant.

The fuel supplier supplies the electricity generating element with a fuel including hydrogen, and the oxidant supplier supplies the electricity generating element with an oxidant. Suitable fuels include liquefied or gaseous hydrogen or a hydrocarbon fuel such as methanol, ethanol, propanol, butanol, or natural gas. Typical examples of the hydrocarbon fuel include methanol, ethanol, propanol, butanol, and natural gas. Suitable oxidants include oxygen and air.

Figure 1:
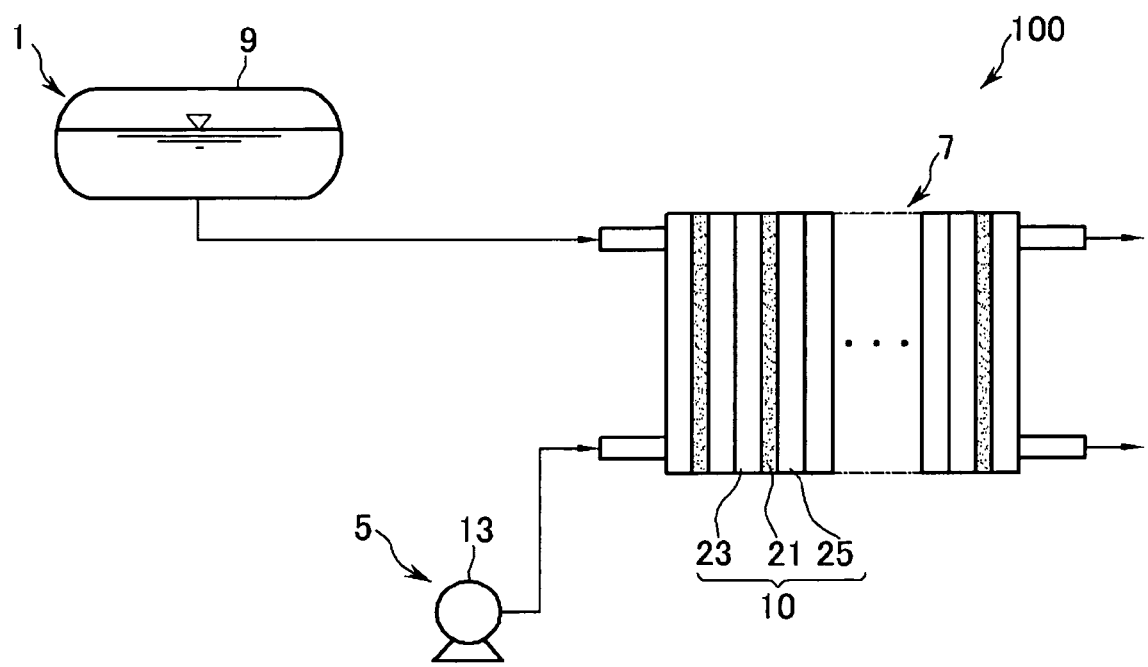
FIG. 1 is a schematic drawing showing a fuel cell system including a membrane-electrode assembly.

FIG. 1 is a schematic illustration of one example of a fuel cell system, but the present invention is not limited to such structures. For example, the fuel cell system of the present invention also includes a structure where a fuel and an oxidant are provided by diffusion instead of by pumps.

A fuel cell system 100 includes a stack 7 composed of a plurality of electricity generating elements 10 that generate electrical energy through an electrochemical reaction of a fuel and an oxidant, a fuel supplier 1 for supplying a fuel to the electricity generating element 10, and an oxidant supplier 5 for supplying an oxidant to the electricity generating element 19.

In addition, the fuel supplier 1 is equipped with a tank 9, which stores fuel. A fuel pump (not shown) may be used to supply fuel from the tank 9 to the stack 7.

The oxidant supplier 5 includes at least one pump 13 for supplying the stack 7 with an oxidant.

The electricity generating element 10 includes a membrane-electrode assembly 21, which oxidizes hydrogen or a fuel and reduces an oxidant, and separators 23 and 25 that are positioned at opposite sides of the membrane-electrode assembly and that supply a fuel and an oxidant, respectively.

The following examples illustrate the present invention in more detail. However, it is understood that the present invention is not limited by these examples.

EXAMPLE 1

10 g of poly(arylene ether sulfone) were added to 50 ml of fuming sulfuric acid. Then, a sulfonation reaction was performed at room temperature for 7 hours to prepare a hydrocarbon polymer having a sulfonic acid substituent and represented by Formula 1a above.

EXAMPLE 2

A polymer having a sulfonic acid substituent according to Example 1 was mixed with 500 g of water as a dispersion solvent. The resulting mixture was coated on an electrode substrate which is commercially available from E-tek Company (anode: Pt/Ru 4 mg/cm$^2$, cathode: Pt 4 mg/cm$^2$), and thereafter was crosslinked with plasma to prepare an electrode for a fuel cell.

A membrane-electrode assembly was prepared by using the above electrodes as a cathode and an anode. The cathode and anode are positioned on opposite sides of a polymer electrolyte membrane made of poly(arylene ether sulfone), and are thermally joined to the polymer electrolyte membrane.

A unit cell was fabricated by inserting the prepared membrane-electrode assembly between two sheets of gaskets, inserting the resulting product between two separators (or bipolar plates) each having a gas flow channel and a cooling channel, and thereafter pressing them between copper end plates.

EXAMPLE 3

A unit cell was fabricated by the same method as in Example 2, except that a composition for forming a catalyst layer including isopropyl alcohol, a binder polymer, and a catalyst was not coated on a carbon paper but was coated directly on a polymer electrolyte membrane and then crosslinked.

COMPARATIVE EXAMPLE 1

A unit cell was prepared by the same method as in Example 2, except that poly(perfluorosulfonic acid) (NAFION™, Dupont Company) (NAFION™ 115) was used instead of a polymer of the present invention as a binder resin to prepare an electrode.

COMPARATIVE EXAMPLE 2

A unit cell was prepared by the same method as in Example 2, except that poly(arylene ether sulfone) was used instead of a water-soluble polymer of the present invention as a binder resin to prepare an electrode.

EXPERIMENTAL EXAMPLES

Fuel cells fabricated according to Examples 2 and 3 and Comparative Example 1 were measured for current density (I) and voltage (V) using known methods. The ion exchange capacities (IEC) after 1000 hours for each cell are provided in Table 1.

TABLE 1

| | Example 2 | Example 3 | Comparative Example 1 |
|---|---|---|---|
| Binder IEC (meq/g) | 2.5 | 2.5 | 1 |
| Initial power output (0.4 V) | 40 mW/cm$^2$ | 70 mW/cm$^2$ | 45 mW/cm$^2$ |
| Power after 500 hours operation (0.4 V) | 40 mW/cm$^2$ | 70 mW/cm$^2$ | 25 mW/cm$^2$ |

An embodiment of the present invention uses a hydrophilic polymer having a similar main chain to that of a polymer electrolyte membrane, or an affinity thereto, as a binder in a catalyst layer to prepare a membrane-electrode assembly. The use of such a binder can thereby make a water-based process possible. In addition, according to embodiments of the invention, catalyst poisoning can be prevented, and environmental problems can be avoided. It can also improve adherence between a polymer resin and an electrode through crosslinking processes, and thereby enhance interface characteristics while avoiding a polymer decomposition, which has been pointed out as a problem of a non-fluorine-based polymer. Furthermore, according to certain embodiments of the invention, the polymer has higher ion exchange capacity (IEC) than other polymers, and accordingly can effectively deliver protons produced on the surface of a catalyst to a polymer electrolyte membrane. Therefore, embodiments of the present invention can provide a fuel cell with improved cell performance characteristics.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell comprising a binder comprising at least one polymer represented by Formula 2:

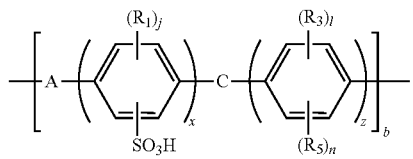

Formula 2 where each of A and C is independently oxygen, sulfur, SO, carbonyl, or sulfonyl; each of x and z is independently an integer from 1 to 10; each of $R_1$, $R_3$, and $R_5$ is independently selected from hydrogen, halogen atoms, alkyls, allyls, aryls, alkylphosphoric acids, alkylsulfonic acids, fluoro alkylsulfonic acids, sulfonic acid, carboxylic acid, phosphoric acid, phosphonic acid, and derivatives thereof; each of j, l, and n independently ranges from 1 to 3; and b ranges from 3 to 10,000.

2. The fuel cell according to claim 1, wherein the polymer is a crosslinked polymer.

3. The fuel cell according to claim 1, wherein the polymer is crosslinked using plasma, UV, or gamma ray radiation.

4. The fuel cell according to claim 1, wherein the polymer is obtained by sulfonation of a polyarylene compound.

5. The fuel cell according to claim 1, further comprising a catalyst layer comprising the binder.

6. The fuel cell according to claim 5, further comprising a catalyst and a protic solvent.

7. The fuel cell according to claim 6, wherein the protic solvent is selected from the group consisting of water, ethanol, isopropyl alcohol, n-propylalcohol, butanol, dimethylsulfoxide, and combinations thereof.

8. The fuel cell according to claim 6, wherein the catalyst is selected from the group consisting of platinum, ruthenium, osmium, platinum-ruthenium alloys, platinum-osmium alloys, platinum-palladium alloys, platinum-M alloys where M is at least one transition element selected from the group consisting of Ga, Ti, V, Cr, Mn, Fe, Co, Ni, Cu, Zn, Sn, Mo, W, and Rh, and combinations thereof.

9. A fuel cell comprising a polymer electrolyte membrane comprising a binder represented by a polymer of Formula 2:

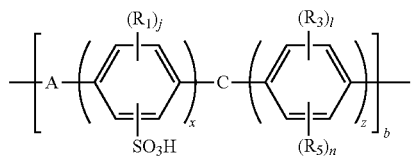

Formula 2 where each of A and C is independently oxygen, sulfur, SO, carbonyl, or sulfonyl; each of x and z is independently an integer from 1 to 10; each of $R_1$, $R_3$ and $R_5$ is independently selected from hydrogen, halogen atoms, alkyls, allyls, aryls, alkylphosphoric acids, alkylsulfonic acids, fluoro alkylsulfonic acids, sulfonic acid, carboxylic acid, phosphoric acid, phosphonic acid, and derivatives thereof; each of j, l and n independently ranges from 1 to 3; and b ranges from 3 to 10,000.

10. The fuel cell according to claim 9, wherein the polymer electrolyte membrane is selected from the group consisting of fluorine-based and non-fluorine-based polymer electrolyte membranes.

11. The fuel cell according to claim 10, wherein the polymer electrolyte membrane comprises a non-fluorine-based polymer.

* * * * *